Patented Dec. 15, 1953

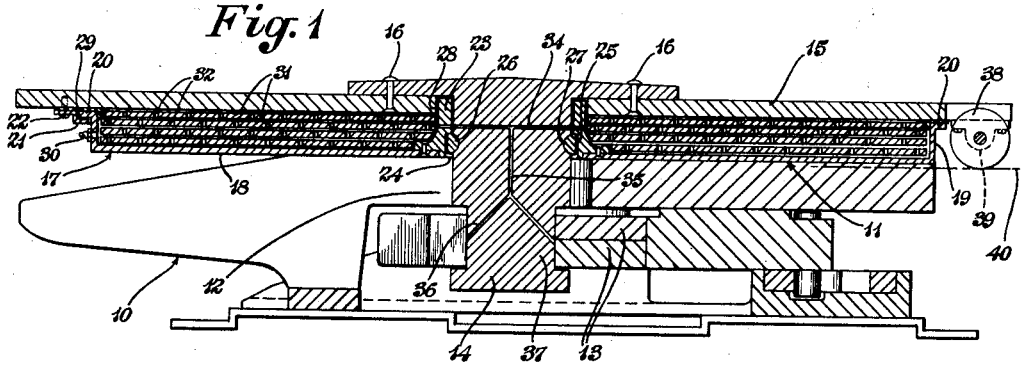

2,662,799

UNITED STATES PATENT OFFICE 2,662,799

FIFTH-WHEEL FOR TRACTOR TRAILERS AND THE LIKE

Gustave C. Schaefer, Canton, Ohio

Application February 5, 1951, Serial No. 209,462

5 Claims. (Cl. 308—136)

The invention relates to fifth wheels, adapted for use as a flexible connection between a tractor and trailer, truck and trailer, semi-trailer, or other vehicle by which it is to be transported, and more especially to the construction of the upper member of the fifth wheel.

The usual flexible connection provided between a tractor and trailer, and the like, comprises a fifth wheel, including a lower fifth wheel member carried by the tractor, or truck, and an upper fifth wheel member, carried by the trailer, and including a king pin adapted to be received in the lower fifth wheel member in order to flexibly couple the tractor, or truck, and trailer together.

The present invention is concerned only with the construction of the upper fifth wheel member, carried by the trailer, or other drawn vehicle, the same being constructed so as to cooperate with the conventional lower fifth wheel member, carried by the tractor, or other driving vehicle.

Under present practice the upper fifth wheel member comprises generally a flat plate, having a centrally located king pin depending therefrom and adapted to be engaged in the usual notch in the lower fifth wheel member, the opposed flat surfaces of the upper and lower fifth wheel members being in frictional contact with each other.

In an attempt to reduce the friction, it is customary to cover the two contacting flat surfaces of the upper and lower fifth wheel members with heavy grease, but the weight of the trailer, or other drawn vehicle, especially when carrying heavy loads, and the friction caused by rotation of the two members relative to each other, causes this grease to be extremely thinned in texture and to be squeezed out from between the two contacting surfaces of the fifth wheel members, so that in a short time the lubricant is entirely dissipated and the two fifth wheel members become quickly worn from intermittent relative movement of the two substantially dry surfaces as the vehicle goes around corners, curves and the like, on streets and highways.

The present invention contemplates a novel construction of upper fifth wheel member, to be carried by the trailer or other drawn vehicle, having means for lubricating the same so as to prevent excessive wear between the upper and lower fifth wheel members.

Another object is to provide an upper fifth wheel member adapted to cooperate with, and to be coupled to, the conventional lower fifth wheel member such as is now in general use upon tractors, trucks and the like.

A further object is to provide an upper fifth wheel member in the form of a turntable, or fifth wheel lubricator, having an annular housing, or lubricant retainer, rotatably mounted upon the usual plate of the upper fifth wheel member, which plate carries the king pin, whereby, when the parts of the fifth wheel are coupled together the annular housing, or lubricant retainer, of the upper fifth wheel member will rest upon the flat upper surface of the conventional lower fifth wheel member and will not rotate relative thereto, but will permit the plate, carrying the king pin, to rotate relative to the annular housing, or lubricant retainer, as the vehicle goes around corners, or curves, lubrication being provided between the two relative movable parts of the upper fifth wheel member to prevent excessive wear.

A still further object is to provide such an upper fifth wheel member in which the rotatable housing, or lubricant retainer, contains one or more independently rotatable, perforate, disc-type lubricant distributors.

Another object is to provide such an upper fifth wheel member in which the rotatable housing has a flat bottom wall, with hub opening at its center through which the king pin is journalled, said hub opening extending above the top of the annular housing so as to prevent lubricant from leaking or escaping from the housing around the king pin.

A further object is to provide such an upper fifth wheel member having a transversely disposed roller, journalled below the forward end of the upper plate, which carries the king pin, and rotatable housing, the bottom of said roller being in a horizontal plane slightly below the flat bottom wall of the rotatable housing, or lubricant retainer, whereby when coupling, or uncoupling, the trailer, or other drawn vehicle, to or from the tractor, truck, or other driving vehicle, this roller rides across the flat top surface of the conventional lower fifth wheel member preventing frictional wear between the two fifth wheel members during the coupling and uncoupling operations.

A still further object is to provide a flange retaining ring for rotatably mounting the annular lubricant housing upon the underside of the top plate, concentric with the king pin.

It is also an object of the invention to provide means for conveying lubricant from the rotatable, annular, lubricant housing, through passages in the king pin, to the exterior of the king pin within the notch of the lower fifth wheel member in which the king pin is rotatably located.

Another object of the present improvement is to provide a sealing means between the rotatable annular housing, the upper plate and the flange retaining ring, to prevent lubricant from leaking from the housing.

The above objects together with others which will be apparent from the drawing and following description, or which may be later referred to, may be attained by constructing the improved fifth wheel in the manner hereinafter described in detail, and illustrated in the accompanying drawing, in which:

Figure 1 is a vertical, sectional view through the improved upper fifth wheel member, showing the same coupled to a conventional lower fifth wheel member;

Fig. 2 a bottom plan view of the upper fifth wheel member, on a smaller scale;

Fig. 3 an enlarged, fragmentary, vertical sectional view through one end portion of the rotatable housing, or lubricant retainer, and adjacent portion of the plate of the upper fifth wheel member; and, Fig. 4 a transverse, sectional view through the king pin and the surrounding hub of the rotatable annular housing, or lubricant retainer.

Referring now more particularly to the construction illustrated in the accompanying drawing, in which similar numerals refer to similar parts throughout, the lower fifth wheel members, as indicated generally at 10, may be of any usual and conventional form having the flat horizontal upper surface 11, the rearwardly disposed V-shaped notch 12, extending substantially to the center thereof, and the usual locking jaws 13 for latching the king pin 14 of the upper fifth wheel member, as in usual and well known practice.

The invention is concerned only with the novel and improved construction of the upper fifth wheel member, which comprises the usual upper plate 15, connected in usual and well known manner to the trailer, or other drawn vehicle, and having the king pin 14 rigidly secured thereto, as by rivets 16, the king pin depending from the upper plate, as in usual and well known practice.

An important feature of the improved construction of upper fifth wheel member is the rotatable, annular housing, or lubricant retainer, indicated generally at 17, having a flat, horizontal, bottom surface 18, adapted to contact and rest upon the flat top surface 11 of the lower fifth wheel member.

The rotatable annular housing, or lubricant retainer, 17 has the annular side wall 19, with outturned peripheral flange 20 at its upper edge, and is rotatably mounted upon the underside of the plate 15, as by the flange retaining ring 21, connected to the underside of the plate 15, as by a plurality of screws 22, or the like.

A central hub 23 is integrally formed upon, or rigidly connected to, the central opening 24 of the rotatable annular housing 18, surrounding the king pin 14, and has the annular recess 25 therein, to receive an annular fastener, which may be in the form of a snap ring 26 or the like which is received into an annular groove 27 in the king pin, for rotatably connecting the housing to the king pin.

As best shown in Fig. 1, it will be seen that the hub 23 extends upward above the top of the rotatable housing 17, and is received within a central opening 28, in the plate 15, so as to prevent lubrication from leaking, or escaping, from the housing 17 around the king pin, or any conventional sealing means may be provided for this purpose.

To prevent the escape of lubricant around the periphery of the housing 17, an annular seal is provided which may be in the form of an annular flanged, rubber ring 29 or the like, interposed between the peripheral flange 20 of the housing 17, the upper plate 15, and flange retaining ring 21, all as shown in detail in Fig. 3.

Lubrication is supplied to the inside of the housing 17 in any suitable manner, such as by a grease fitting 30, of any conventional construction. Within the housing 17 is located one, or a plurality of independently rotatable, perforate lubricating discs 31, having perforations 32 located in staggered relation to each other, so as to distribute lubrication between the underside of the plate 15 and the interior of the housing 17.

In order to lubricate the king pin 14, within the notch 12 of the lower fifth wheel member, a plurality of radial openings 33 may be provided in the hub 23, above the snap ring 26, and adapted to communicate with radial passages 34, in the king pin 14, which in turn communicates with a horizontal passage 35 therein, which in turn communicates with the downwardly inclined, radial passages 36, extending to the exterior of the reduced portion 37 of the king pin, so as to lubricate the same within the lower fifth wheel member.

For the purpose of reducing friction between the upper and lower fifth wheel members during the coupling and uncoupling operations, a transversely disposed roller 38 is journalled at the forward end of the upper plate 15, as in bearings 39 depending from the underside of the plate.

As best shown in Fig. 1 by the broken line 40, the bottom of the roller 38 is in a horizontal plane slightly below the flat bottom wall 18 of the rotatable, lubricant retainer housing 17, so that when the parts of the fifth wheel are coupled, or uncoupled, the upper fifth wheel member will not frictionally drag across the top surface 11 of the lower fifth wheel member, but the weight of the upper fifth wheel member, and the trailer, or other drawn vehicle, upon which it is mounted, will be carried by the roller 38, which will roll across the flat top surface 11 of the lower fifth wheel member until the parts are in coupled position, when the roller will pass out of contact therewith, as shown in Fig. 1.

In uncoupling the parts it will be seen that as soon as the two members of the fifth wheel start to relatively move in opposite directions, the roller 38 will ride up upon the flat top surface 11 of the lower fifth wheel member and carry the load of the upper fifth wheel member until the parts are uncoupled.

As best shown in Fig. 2, it will be seen that the flange retaining ring 21 may be cut away at the forward end, as at 41, in order that the roller 38 may be located as close as possible to the forward side of the rotatable housing 17.

From the above it will be obvious that a greatly improved fifth wheel construction is thus produced, in which proper lubrication may be maintained between the moving parts of the fifth wheel so as to reduce to a minimum the friction and wear produced in the conventional type of fifth wheel.

I claim:

1. A fifth wheel bearing comprising a lower fifth wheel member having a substantially flat top surface, an upper fifth wheel member comprising a substantially horizontal plate, a king pin fixed to the upper member and depending therefrom for detachable connection to the lower member, an annular flange retaining ring fixed to the underside of the upper member, an annular housing having an annular flange at its upper open end rotatably mounted upon said flange retaining ring and surrounding the king pin, said housing having a flat bottom wall adapted to contact the flat top surface of the lower member, a cylindrical hub fixed to the central portion of the housing and surrounding the king pin, said hub extending entirely through said upper member, a plurality of discs independently rotatably mounted within the housing, and means for inserting lubricant into the housing.

2. A fifth wheel bearing comprising a lower fifth wheel member having a substantially flat top surface, an upper fifth wheel member comprising a substantially horizontal plate, a king pin fixed to the upper member and depending therefrom for detachable connection to the lower member, an annular flange retaining ring fixed to the underside of the upper member, an annular housing having an annular flange at its upper open end rotatably mounted upon said flange retaining ring and surrounding the king pin, said housing having a flat bottom wall adapted to contact the flat top surface of the lower member, a cylindrical hub fixed to the central portion of the housing and surrounding the king pin, said hub extending entirely through said upper member, means rotatably mounting the hub upon the king pin, a plurality of discs independently rotatably mounted within the housing, and means for inserting lubricant into the housing.

3. A fifth wheel bearing comprising a lower fifth wheel member having a substantially flat top surface, an upper fifth wheel member comprising a substantially horizontal plate, a king pin fixed to the upper member and depending therefrom for detachable connection to the lower member, an annular flange retaining ring fixed to the underside of the upper member, an annular housing having an annular flange at its upper open end rotatably mounted upon said flange retaining ring and surrounding the king pin, said housing having a flat bottom wall adapted to contact the flat top surface of the lower member, a cylindrical hub fixed to the central portion of the housing and surrounding the king pin, a disc independently rotatably mounted within the housing, and means for inserting lubricant into the housing, there being radial openings in the hub and transverse and longitudinal passages in the king pin for conveying lubricant from the housing to the exterior of the king pin within the lower fifth wheel member.

4. An upper fifth wheel member for detachable connection to a lower fifth wheel member having a flat top surface, said upper fifth wheel member comprising a substantially horizontal plate, a king pin fixed to said plate and depending therefrom for detachable connection to the lower member, an annular flange retaining ring fixed to the underside of said plate, an annular housing having a peripheral flange at its upper open end rotatably mounted upon said flange retaining ring and surrounding the king pin, said housing having a flat bottom wall for contact with the flat top surface of the lower fifth wheel member, a cylindrical hub fixed to the central portion of the housing and having an annular recess therein, a retaining ring connected to the king pin and received in said annular recess, disc means within the housing contacting said horizontal plate and the bottom wall of the housing, and means for inserting lubricant into the housing.

5. An upper fifth wheel member for detachable connection to a lower fifth wheel member having a flat top surface, said upper fifth wheel member comprising a substantially horizontal plate, a king pin fixed to said plate and depending therefrom for detachable connection to the lower member, an annular flange retaining ring fixed to the underside of said plate, an annular housing having a peripheral flange at its upper open end rotatably mounted upon said flange retaining ring and surrounding the king pin, said housing having a flat bottom wall for contact with the flat top surface of the lower fifth wheel member, a cylindrical hub fixed to the central portion of the housing and having an annular recess therein, a retaining ring connected to the king pin and received in said annular recess, disc means within the housing contacting said horizontal plate and the bottom wall of the housing, a lubricant fitting in the housing for inserting lubricant into the housing, and sealing means between the housing and the horizontal plate for preventing escape of lubricant from the housing.

GUSTAVE C. SCHAEFER.

References Cited in the file of this patent

UNITED STATES PATENTS

| Number | Name | Date |
|---|---|---|
| 1,069,699 | Hopkins | Aug. 12, 1913 |
| 1,485,799 | Miner | Mar. 4, 1924 |
| 2,144,243 | Fraser et al. | Jan. 17, 1939 |
| 2,357,672 | Lee et al. | Sept. 15, 1944 |
| 2,508,610 | Kendall | May 23, 1950 |

FOREIGN PATENTS

| Number | Country | Date |
|---|---|---|
| 553,673 | Great Britain | June 1, 1943 |